United States Patent [19]

Takeo et al.

[11] Patent Number: 5,267,726
[45] Date of Patent: Dec. 7, 1993

[54] HYDRAULIC DAMPING DEVICE

[75] Inventors: Shigeki Takeo; Hitoshi Tajima, both of Inazawa, Japan

[73] Assignee: Toyoda Gosei Co., Ltd., Nishikasugai, Japan

[21] Appl. No.: 859,047

[22] Filed: Mar. 27, 1992

[30] Foreign Application Priority Data

Mar. 29, 1991 [JP] Japan .................................. 3-093290

[51] Int. Cl.$^5$ .............................................. F16F 13/00
[52] U.S. Cl. ................................. 267/140.14; 267/35; 267/219; 267/64.28
[58] Field of Search ..................... 267/140.11, 140.13, 267/140.14, 35, 219, 141, 294, 64.28, 64.14, 64.23; 248/562, 636

[56] References Cited

U.S. PATENT DOCUMENTS

| | | | |
|---|---|---|---|
| 4,583,723 | 4/1986 | Ozawa . | |
| 4,610,421 | 9/1986 | Ohta et al. . | |
| 4,635,910 | 1/1987 | Ozawa et al. . | |
| 4,650,169 | 3/1987 | Eberhard et al. | 267/140.13 |
| 4,700,933 | 10/1987 | Chikamori et al. . | |
| 4,753,422 | 6/1988 | Thorn | 267/140.13 |
| 4,784,378 | 11/1988 | Ford | 267/140.11 X |
| 4,828,234 | 5/1989 | Hoying et al. | 267/140.14 |
| 4,858,879 | 8/1989 | Miyamoto et al. | 267/140.13 X |
| 4,901,986 | 2/1990 | Smith | 267/140.14 |
| 4,932,636 | 6/1990 | Phillips et al. | 267/140.13 |
| 5,037,071 | 8/1991 | Takano et al. | 267/219 X |
| 5,092,566 | 3/1992 | Freudenberg | 267/140.14 |
| 5,145,156 | 9/1992 | Muramatsu et al. | 267/140.13 X |

Primary Examiner—Robert J. Oberleitner
Assistant Examiner—Peter M. Poon
Attorney, Agent, or Firm—Cushman, Darby & Cushman

[57] ABSTRACT

A hydraulic damping device for preventing the transmission of vibrations of wide-ranging frequencies. The device includes a thick vibration damping rubber body which defines a main liquid chamber therewithin, first and second deformable rubber diaphragms which respectively define first and second auxiliary liquid chambers, first and second passageways for respectively connecting the auxiliary liquid chambers to the main liquid chamber, each passageway generating liquid resonance in a predetermined frequency vibration range different from each other, and a bottom plate for defining a pressure chamber with the first deformable rubber diaphragm which defines the first auxiliary liquid chamber connected with the main liquid chamber by the first passageway generating liquid resonance in a high-frequency vibration range. The pressure chamber is selectively brought into communication with the atmosphere or a negative pressure source. When idle vibrations are input, the pressure chamber communicates with the atmosphere to freely deform the first deformable rubber diaphragm, whereby a damping liquid flows mainly through the first passageway and accordingly the idle vibrations are effectively absorbed, whereas when shake vibrations are input, the pressure chamber communicates with the negative pressure source to restrict the free deformation of the first deformable rubber diaphragm, whereby the damping liquid flows mainly through the second passageway generating liquid resonance in a low-frequency vibration range, and accordingly shake vibrations are effectively restrained.

3 Claims, 2 Drawing Sheets

HYDRAULIC DAMPING DEVICE

BACKGROUND OF THE INVENTION

1. Field of the Invention

The present invention relates to a hydraulic damping device, and more particularly to a hydraulic damping device for preventing the transmission of vibrations of wide-ranging frequencies having a simple construction.

2. Description of the Related Art

A hydraulic damping device employed as an engine mount for a vehicle, is required to absorb idle vibrations occurring when an engine is idling, and to restrain shake vibrations occurring while the vehicle is running. In order to absorb the idle vibrations, the spring constant of the device must be decreased, and in order to restrain the shake vibrations, the damping coefficient of the device must be decreased.

U.S. Pat. No. 4,700,933 discloses a hydraulic damping device wherein the transmission of the above-described idle and shake vibrations have been prevented by varying the cross-sectional area and length of the passageway for a damping liquid by the operation of valve means.

U.S. Pat. No. 4,610,421 discloses a hydraulic damping device wherein idle and shake vibrations are prevented by controlling the opening and closing of an orifice by valve means.

However, the size of the above-referenced damping devices provided with valve means becomes large, and is difficult to be used, since the engine mount must be installed in a limited space within an engine compartment.

U.S. Pat. No. 4,583,723 and U.S. Pat. No. 4,635,910 disclose fluid damping devices having electromagnetic devices arranged within the damping device, thus, increasing the overall size of the damping device which makes it difficult to use within an engine compartment.

SUMMARY OF THE INVENTION

It is an object of the present invention to provide a hydraulic damping device wherein the damping characteristics is variable against vibrations of wide-ranging frequencies having a simple and compact construction, thereby effectively preventing the transmission of these vibrations.

The hydraulic damping device of the present invention has a thick vibration damping rubber body which supports a vibrating body and defines a main liquid chamber therewithin, a first and second deformable rubber diaphragm which respectively define first and second auxiliary liquid chambers therewithin, and first and second passageways, each of which allows the auxiliary liquid chambers to communicate with the main liquid chamber, each passageway generating liquid resonance in a predetermined frequency vibration range different from each other. The hydraulic damping device of the present invention is further provided with control means for restricting the free deformation of the first rubber diaphragm which defines the first auxiliary liquid chamber which communicates with the first passageway, which generates liquid resonance in a high-frequency vibration range, when vibrations of a predetermined frequency range are input from the vibrating body.

More specifically, the thick vibration damping rubber body has an inner cavity which opens downwardly. A partition member is provided so as to close the inner cavity of the vibration damping rubber body, thereby defining the main liquid chamber. The first deformable rubber diaphragm is provided under the partition member with the outer periphery of the first rubber diaphragm in close contact with the outer periphery of the lower surface of the partition member, thereby defining the first auxiliary liquid chamber between the partition member and the first rubber diaphragm. The partition member includes the first passageway of a relatively large diameter and a relatively short length, which penetrates the partition member and communicates with the first auxiliary liquid chamber, wherein a damping liquid generates resonance in a high-frequency vibration range. The partition member has a closed chamber which is divided by the second rubber diaphragm into two sections, one of two sections composing a second auxiliary liquid chamber. The partition member further includes the second passageway of a relatively small diameter and a relatively long length, which brings the second auxiliary liquid chamber into communication with the main liquid chamber, wherein the damping liquid generates resonance in a low-frequency vibration range.

When idle vibrations are input to the hydraulic damping device having the above-described construction, the operation of the control means is stopped to bring the one rubber diaphragm into the freely deformable state. As a result, the damping liquid flows mainly into the one passageway wherein liquid resonance of the damping liquid is generated in a high-frequency vibration range. By setting the resonance frequency equal to that of the idle vibrations, the spring constant of the device can be sufficiently decreased in this range, whereby idle vibrations are effectively absorbed.

On the other hand, when shake vibrations are input to the hydraulic damping device of the present invention while the vehicle is running, the control means operates to restrict the free deformation of the first rubber diaphragm defining the first auxiliary liquid chamber so as to prevent the variation in the volume thereof. As a result, the damping liquid does not flow into the first auxiliary liquid chamber, and most of the damping liquid flows into the second auxiliary liquid chamber by way of the second passageway wherein resonance of the damping liquid is generated in a lower-frequency vibration range. By setting resonance frequency equal to that of the shake vibrations, the damping coefficient of the device is sufficiently increased in this range, whereby shake vibrations are effectively restrained.

Other objects, features and characteristics of the present invention will become apparent upon consideration of the following description and the appended claims with reference to the accompanying drawings, all of which form a part of this specification.

DETAILED DESCRIPTION OF THE PRESENTLY PREFERRED EXEMPLARY EMBODIMENTS

Figure 1:
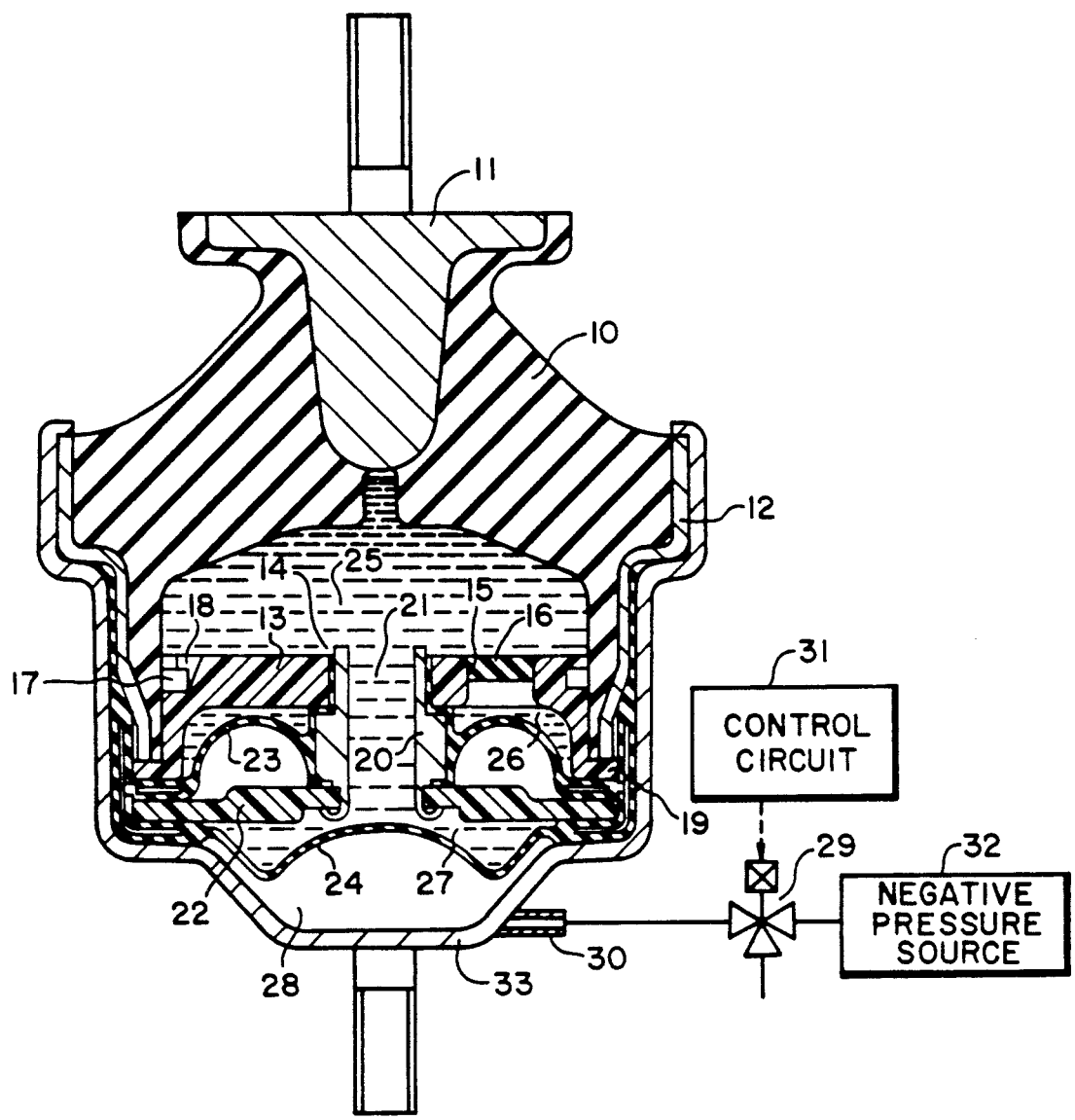
FIG. 1 is an overall cross-sectional view of an embodiment of a hydraulic damping device in accordance with the principles of the present invention, wherein a partition member is taken along the line I—I of FIG. 2.

In FIG. 1, a vibration damping rubber body 10 is composed of a cylindrical thick rubber block having an inner cavity which is of a circular cross-section and which opens downwardly. A connecting member 11 having a bolt portion is embedded at an axial center of the rubber body 10 to support an engine (not shown). A cylindrical side plate 12 is joined to an outer periphery of the rubber body 10, and an upper partition plate 13 is inserted into the cylindrical side plate 12 from the lower side thereof, thereby dividing the interior of the cylindrical side plate 12 into two sections.

Figure 2:
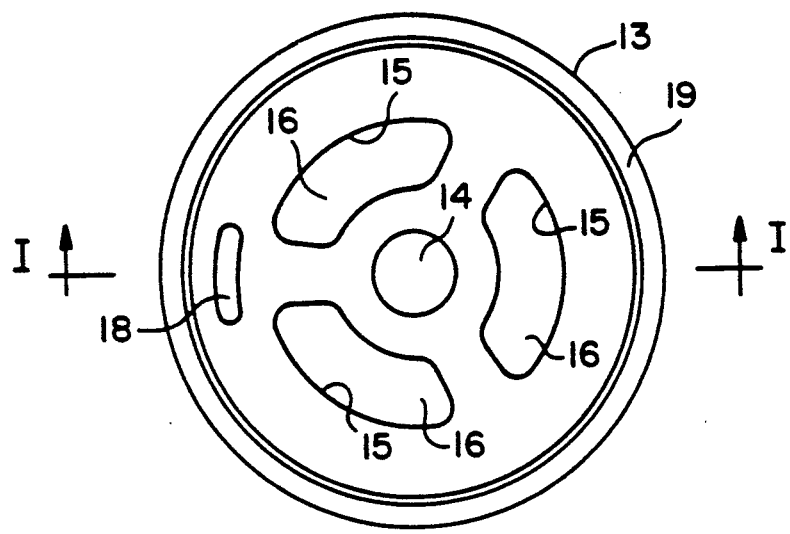
FIG. 2 is a plan view of the partition member.

The upper partition plate 13 has a circular configuration, as shown in FIG. 2. A circular aperture 14 is formed so as to penetrate an axial center of the upper partition plate 13, and three arc-shaped apertures 15 are formed around the circular aperture 14. Each of these arc-shaped apertures 15 is closed by a rubber diaphragm 16.

Along the outer peripheral surface of the upper partition plate 13, a recess 17 serving as one passageway for a damping liquid is formed over the entire length thereof, as shown in FIG. 1. The recess 17 communicates with a long hole 18 which opens at the upper surface of the upper partition plate 13. The recess 17 also communicates with another long hole (not shown) which opens at the lower surface of the upper partition plate 13 at a substantially radially symmetric position with respect to the long hole 18.

The upper partition plate 13 has a flange portion 19 which extends downwardly from the outer periphery thereof and bends outwardly. The flange portion 19 contacts with the lower end of the side plate 12.

A cylindrical member 20 is inserted into the circular aperture 14 of the upper partition plate 13 from the lower side thereof, thereby defining another passageway 21 for the damping liquid.

A lower partition plate 22 having a circular aperture at its axial center, defining an inner periphery is fitted to the outer periphery of the lower end of the cylindrical member 20 at the inner periphery.

An annular rubber diaphragm 23 extends between the upper partition plate 13 and the lower partition plate 22 with both the inner peripheral portion and outer peripheral portion of the diaphragm 23 clamped thereby.

The lower end of the cylindrical member 20 is covered with a rubber diaphragm 24. The outer peripheral portion of the rubber diaphragm 24 is clamped by the lower partition plate 22 and a stepped portion of a bottom plate 33, thereby defining a main liquid chamber 25, and auxiliary liquid chambers 26, 27 which respectively communicate with the main liquid chamber 25 by way of the passageways 17, 21.

The passageway 17 has a smaller cross-sectional area and a larger length as compared with passageway 21. Therefore, the damping liquid flowing through the passageway 17 generates resonance in a low-frequency vibration range of about 10 Hz, whereas the damping liquid flowing through the passageway 21 generates resonance in a high-frequency vibration range of about 30 Hz The bottom plate 33 extends upwardly and is secured to an upper portion of the side plate 12 by caulking, thereby defining a closed pressure chamber 28 between the rubber diaphragm 24 and the bottom plate 33. The pressure chamber 28 is brought into communication with a three-way type solenoid valve 29 by way of a gas pipe 30. The solenoid valve 29 is operated by a control circuit 31 to selectively connect the gas pipe 30 to the atmosphere or a negative pressure source 32.

The damping device of the present embodiment having the above-described construction is secured to a frame of a vehicle in a bolt portion provided in the bottom plate 33.

In operation, when idle vibrations of about 30 Hz are input when the engine is idling, the control circuit 31 operates the solenoid valve 29 to bring the gas pipe 30 into communication with the atmosphere. As a result, the pressure of the pressure chamber 28 becomes equal to the atmospheric pressure, and the rubber diaphragm 24 becomes freely deformable.

Due to the input of the idle vibrations in this state, the damping liquid within the main liquid chamber 25 flows mainly into the passageway 21 of a larger diameter, and generates resonance therein in accordance with the input idle vibrations. As a result, in the frequency range of about 30 Hz, the spring constant of the damping device is sufficiently decreased, as shown by line x in FIG. 3, accordingly, the damping device effectively absorbs the idle vibrations.

Figure 3:
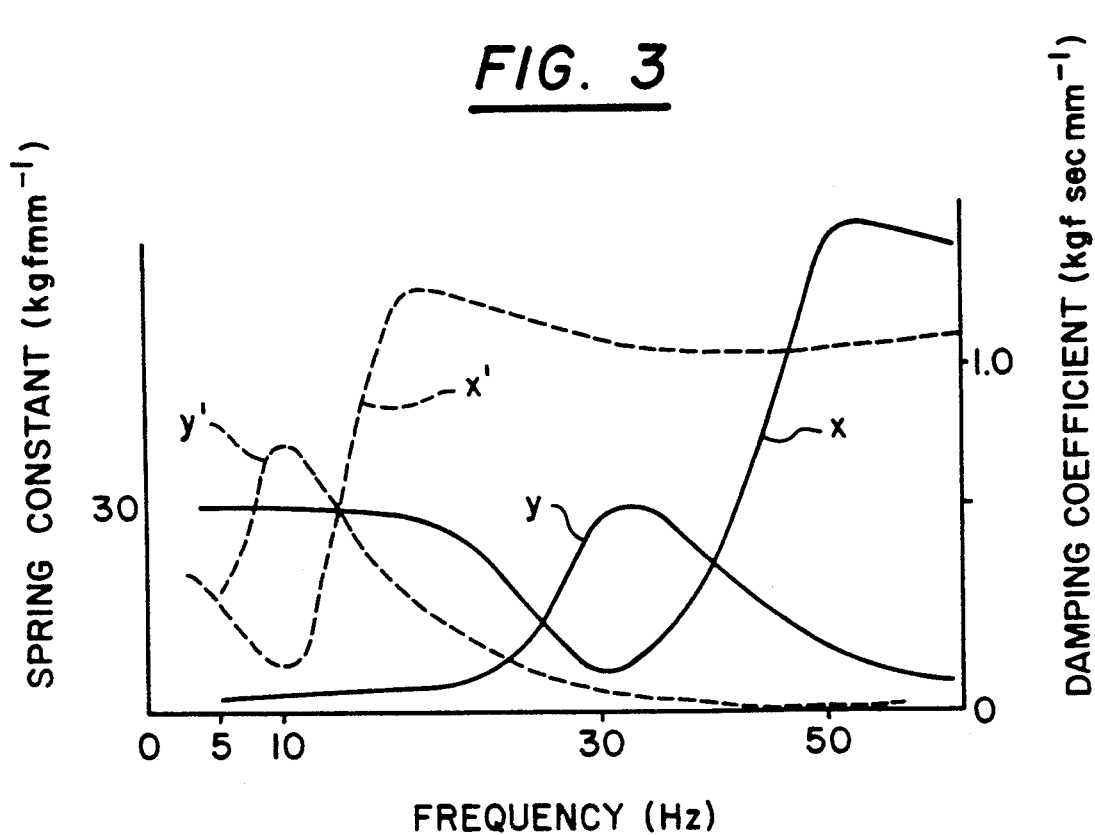
FIG. 3 is a graph showing frequency characteristics of the device.

In FIG. 3, line y indicates the damping coefficient in this state.

When shake vibrations of about 10 Hz are input while the vehicle is running, the control circuit 31 operates the solenoid valve 29 to bring the gas pipe into communication with the negative pressure source 32 such as an intake pipe of an engine, or the like. As a result, the pressure in pressure chamber 28 becomes negative, and the rubber diaphragm 24 is attracted toward and strongly adhered to the bottom plate 33. Accordingly, a free deformation of the rubber diaphragm 24 is restricted so that the variation in the volume of the auxiliary liquid chamber 27 is prevented.

Due to the input of the shake vibrations in this state, most of the damping liquid enclosed within the main liquid chamber 25 flows into the auxiliary liquid chamber 26 by way of the passageway 17 of a small diameter, whereby the damping liquid generates resonance in the passageway 17 in accordance with the input shake vibrations. Thus, the damping coefficient of the damping device is sufficiently increased in the frequency range of about 10 Hz, as shown by line y' in FIG. 3. Accordingly, the damping device effectively restrains shake vibrations. In FIG. 3, line x' indicates the spring constant in this state.

While the vehicle is running, high frequency small amplitude vibrations of about 100 Hz may be generated. With the present embodiment, the pressure variation in the main liquid chamber 25 caused by these high frequency small amplitude vibrations is absorbed by the rubber diaphragms 16 provided in the upper partition plate 13.

As described above, with the hydraulic damping device of the present invention, the transmission of vibrations of wide-ranging frequencies can be effectively prevented with a simple and compact construction.

While the invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed is:

1. A hydraulic damping device comprising:

a thick vibration damping rubber body for supporting a vibrating body, said rubber body having an inner cavity which opens downwardly;

a partition member which closes said inner cavity for defining a main liquid chamber, said partition member having a closed chamber;

first and second deformable rubber diaphragms which respectively define first and second auxiliary liquid chambers therewithin, said first rubber diaphragm being disposed under said partition member with its outer periphery in close contact with an outer periphery of a lower surface of said partition member for defining said first auxiliary liquid chamber between said partition member and said first rubber diaphragm, said second rubber diaphragm being disposed so as to divide said closed chamber of said partition member into two sections for defining said second auxiliary liquid chamber within said closed chamber of said partition member;

said partition member having first and second passageways for respectively connecting said first and second auxiliary liquid chambers to said main liquid chamber, said first passageway having a large diameter and a short length, and penetrating an axial center of said partition member, a damping liquid being disposed in said first passageway generating resonance in a high-frequency vibration range, said second passageway having a diameter smaller and length larger than said first passageway, a damping liquid being disposed in said second passageway generating resonance in a low-frequency vibration range, a bottom plate provided under said first rubber diaphragm for defining a pressure chamber between said first rubber diaphragm and said bottom plate; and control means for restricting free deformation of said first deformable rubber diaphragm, and preventing variation in volume of said first auxiliary liquid chamber, said control means selectively bringing said pressure chamber into communication with one of the atmosphere and a negative pressure source, whereby, when said pressure chamber is brought into communication with said negative pressure source, said first rubber diaphragm is attracted toward and is adhered to said bottom plate and free deformation of said first rubber diaphragm is restricted.

2. The hydraulic damping device according to claim 1, wherein:

said partition member is composed of an upper partition plate which has an outer peripheral portion bending downwardly and a lower partition plate which has an outer peripheral portion in close contact with said downwardly bending outer peripheral portion, thereby defining said closed chamber between said upper partition plate and said lower partition plate, a cylindrical member having an interior which serves as said first passageway penetrates said upper and lower partition plates, said second rubber diaphragm which defines said second auxiliary liquid chamber extends from an outer periphery of said cylindrical member to closely contact outer peripheral edges of said upper partition plate and said lower partition plate, said second passageway is formed along an outer peripheral portion of said upper partition plate.

3. The hydraulic damping device according to claim 2, wherein at least one aperture is formed so as to penetrate said upper partition plate, said at least one aperture being covered with a rubber diaphragm for absorbing the variation in the inner pressure of said main liquid chamber.

* * * * *